United States Patent Office 3,476,809
Patented Nov. 4, 1969

3,476,809
OLEFIN OXIDATION CATALYST
Frederick W. Steffgen, Laguna Beach, Calif., assignor to Atlantic Richfield Company, a corporation of Pennsylvania
No Drawing. Filed Sept. 29, 1965, Ser. No. 491,431
Int. Cl. C07c 45/04, 45/02
U.S. Cl. 260—604                13 Claims The invention relates to novel catalytic materials used in the oxidation of olefins to $\alpha$-$\beta$ unsaturated carbonyl compounds such as aldehydes and ketones and more particularly to novel copper phosphate-based catalytic materials which display excellent selectivity for converting olefins to $\alpha$-$\beta$ unsaturated aldehydes and ketones when utilized as catalysts in the oxidation of olefins. The invention also relates to a method for preparing the novel oxidation catalysts of this invention, and to a method for preparing $\alpha$-$\beta$ unsaturated aldehydes and ketones from olefins.

$\alpha$-$\beta$ unsaturated aldheydes and ketones are valuable substances finding utility as starting materials in the preparation of a wide variety of products. For example, useful homopolymers may be prepared from $\alpha$-$\beta$ unsaturated aldehydes such as acrolein and methacrolein, as well as valuable co-polymers having widely varying properties by the combination therewith of co-polymerizable ethylenically unsaturated monomers such as ethylene, propylene, vinyl chloride, vinylidene chloride, vinyl acetate, acrylic acid, methyl acrylate and the like.

Several methods for synthesizing $\alpha$-$\beta$ unsaturated aldehydes and ketones have been previously proposed, with one of the more attractive entailing the reaction of olefinic hydrocarbons readily and economically available from petroleum sources and the like, at elevated temperatures with oxygen in the presence of a catalyst which promotes conversion of the olefin to the corresponding unsaturated aldehyde or ketone. This catalytic oxidation technique suffers from the disadvantage that, along with the desired unsaturated aldehyde or ketone acids, saturated aldehydes, epoxides, carbon monoxide and carbon dioxide are formed as byproducts. Hence, in order for the catalytic oxidation technique to be commercially attractive as a means for preparing $\alpha$-$\beta$ unsaturated aldehydes and ketones, it is imperative that the catalysts employed be selective in their conversion of the olefin feed to the desired unsaturated carbonyl compound.

One of the more popular catalysts employed in the past in the oxidation of olefins to unsaturated aldehydes, e.g. propylene to acrolein, is bismuth phosphomolybdate. While the bismuth phosphomolybdate-based catalysts have provided satisfactory selectivity in terms of propylene conversion to acrolein, these catalysts are relatively expensive and require more sophisticated procedures in their synthesis and utilization. Accordingly, the utilization of bismuth phosphomolybdate catalysts has not been entirely satisfactory in terms of over-all economic considerations, and the art has sought to develop simpler and cheaper catalytic materials.

Silver and silver oxide supported catalysts long have been employed in the oxidation of ethylene. It was considered that such catalysts, therefore, might possibly be useful in the oxidation of olefins such as propylene in which oxidation, the desired $\alpha$-$\beta$ unsaturated carbonyl compounds, are produced; however, attempts to prepare acrolein from the oxidation of propylene using the silver-based catalysts have proved to be unsuccessful. The silver-based catalysts convert little propylene at ordinary oxidation temperatures, and when operated at higher temperature, they are unsatisfactory because of low yields of acrolein and the reaction is difficult to control. Moreover, attempts to employ modifiers with such silver-based catalysts have not yielded any significant improvement. Hence, the use of silver catalysts in acrolein, methylacrolein and the like oxidation synthesis has produced commercially impractical results.

It has also been previously suggested that unsupported and supported metal oxides such as the oxides of chromium, cobalt, iron, nickel and cooper be used as catalysts in the oxidation of olefins. Of such oxides, only copper oxide has provided any beneficial results. The use of the remainder of these metal oxides to convert propylene to acrolein has resulted in almost a total conversion of the propylene to carbon dioxide and water. Moreover, variations of such catalysts which do provide partial conversions to acrolein have been plagued with temperature control problems, even at low conversions. Excessive catalyst fouling has also been displayed by such metal oxides.

Copper oxide-based catalysts previously have been reported to provide substantial conversion of olefins, such as propylene, to the corresponding $\alpha$-$\beta$ unsaturated carbonyl compounds. These catalysts generally have been employed in combination with a support material such as silica, silica gel, alumina, pumice, titanium dioxide, boron phosphate, aluminium phosphate, and clay. Copper oxide-based catalysts are generally utilized in combination with modifiers such as selenium, tungsten, molybdenum, and the like. Even with these copper oxide modified catalysts, a determination of the proper composition in terms of ratos of copper oxides to modifiers and selection of base material has proved completely unpredictable in view of the poor results obtained.

Another previous method has involved the use of copper phosphate on such support materials as silica gel, boron phosphate, titanium dioxide, clay and pumice stone. The catalytic material is formed by wetting the support material with an excess of an aqueous solution containing the cupric salt of a volatile acid such as a nitrate, chloride, etc., and free phosphoric acid or ammonium phosphate, decanting the excess solution from the wetted support material, and calcining the resultant impregnated support material at about 100° C. to 500° C. The resulting catalysts have been found to display relatively poor propylene conversion, selectivity for acrolein formation and/or temperature control characteristics.

Because of the industrial value of $\alpha$-$\beta$ unsaturated carbonyl compounds, and in view of the attractiveness of the oxidation-type synthesis therefor from petroleum hydrocarbons in terms of starting material economy, there has been a continuous search for inexpensive catalytic materials which can be used in the oxidation technique to provide commercially satisfactory activities, olefin conversion, and unsaturated carbonyl compound selectivity.

Accordingly, it is a primary object of the present invention to provide a novel catalyst material for the oxidation of olefins to $\alpha$-$\beta$ unsaturated carbonyl compounds.

It is another object of the present invention to provide a novel catalyst for utilization in the oxidation of olefins such as propylene to the corresponding $\alpha$-$\beta$ unsaturated carbonyl compounds such as acrolein.

It is an additional object of the present invention to provide a novel catalyst which is relatively inexpensive, formed from readily available starting materials, and displays satisfactory activity when utilized as a catalyst in the oxidation of olefins to $\alpha$-$\beta$ unsaturated carbonyl compounds.

It is a further object of the present invention to provide a novel catalyst which provides satisfactory starting material conversion in the oxidation of olefins to $\alpha$-$\beta$ unsaturated carbonyl compounds.

Yet another object of the present invention is to provide a novel catalyst which exhibits and promotes a highly selective oxidative conversion of olefins to $\alpha$-$\beta$ unsaturated carbonyl compounds.

It is a particular object of the present invention to provide a novel copper phosphate-based catalyst which has excellent activity, conversion level, and selectivity properties when employed in the oxidation of propylene to acrolein.

It is still a further object of the present invention to provide a method for preparing a novel copper phosphate-based catalyst for use in olefin oxidation reactions.

An additional object of the present invention is to provide an improved method for preparing $\alpha$-$\beta$ unsaturated carbonyl compounds by oxidizing olefin starting materials in the presence of novel copper phosphate-based catalysts.

Broadly described, the present invention is concerned with a catalytic oxidation process in which olefins are converted to $\alpha$-$\beta$ unsaturated carbonyl compounds. The catalysts employed comprise an inert macroporous support material such as fused alumina which has deposited thereon a catalytically effective amount of an active material selected from the group consisting of cupric phosphate and a mixture of cupric phosphate and phosphorus pentoxide.

The catalysts of the present invention can be prepared by several methods. They are generally prepared by first preparing a solution containing cupric phosphate, i.e., $Cu(NO_3)_2$ and $H_3PO_4$ or $(NH_4)H_2PO_4$. After the cupric phosphate containing solution has been prepared, an inert support material is impregnated with the solution and then heated to dryness. It has been found that particularly good catalysts can be prepared if a nitric acid or ammonium hydroxide solution of cupric phosphate is used. The solution used to impregnate the support material should contain sufficient phosphate to provide a stoichiometric amount for the copper plus enough excess phosphate to give, on a $P_2O_5$ basis, up to about 10 weight percent of the cupric phosphate. In other words, the weight ratio of cupric phosphate to $P_2O_5$ on the support should be not less than about 10:1, preferably the ratio should be from 15:1 to 50:1. The excess $P_2O_5$ assures the absence of cupric oxide which hinders the effectiveness of the catalyst.

Although the present invention is applicable to situations where an excess of $P_2O_5$ over the amount representing a stoichiometric equivalent of cupric phosphate is not present, it is preferred to have an excess of $P_2O_5$. The relative amount of excess $P_2O_5$ present, if any, with respect to the cupric phosphate, content of the catalyst, is an important factor which must be controlled in order for the catalyst to have satisfactory oxidation characteristics. When the amount of excess $P_2O_5$ present is such that the weight ratio of cupric phosphate to excess $P_2O_5$ is less than about 10:1, the catalyst displays relatively poor activity and unsatisfactory selectivity for conversion of the olefin feed to the desired $\alpha$-$\beta$ unsaturated carbonyl compounds.

The solutions used to impregnate the support material should be essentially free of materials which are nonvolatile at higher temperatures, i.e., about 200° C.–300° C. and ambient pressures other than the cupric phosphate and $P_2O_5$. The source of $P_2O_5$ is of course any excess phosphate present in the solution. The cupric phosphate can be deposited in widely varying amounts with about 0.1 to about 15% by weight of the support material being most practical. Larger amounts of cupric phosphate can be used, but they do not provide any significant improvement in results. The preferred range is from about 1% to about 8% by weight of the support material. The excess $P_2O_5$ can be provided by the inclusion in the impregnating solution of such common $P_2O_5$ sources as free phosphoric acid or normally volatile phosphate salts such as ammonium phosphate.

When nitric acid solutions of cupric phosphate are used, a slightly more active catalyst is produced than when ammoniacal solutions of cupric phosphate are used, but the ammoniacal solutions produce catalysts having better selectivity for olefin conversion to the desired unsaturated carbonyl and are thus preferred.

Another method for preparing the catalyst entails the preparation of a slurry of cupric phosphate in water containing a sufficient amount of phosphoric acid, ammonium phosphate, or other phosphate source, which does not leave a residue other than cupric phosphate or phosphorus pentoxide when heated, to enable the deposition of the desired amount of the active catalytic materials on the support material. When a slurry of cupric phosphate is used, the support material is mixed with the slurry until it has become completely wetted. This procedure provides catalysts which are more difficult to control and which promote less selective conversion of the olefin to the desired unsaturated carbonyl compounds than do those catalysts which are prepared using acidic or basic impregnating solutions.

After the cupric phosphate solution has been applied to the support material, it is heated to remove the volatile materials and effect precipitation of the cupric phosphate upon the support material. The heating step, which activates the catalyst, is carried out at elevated temperatures under ventilation conditions which enable removal of all volatile calcination products. The final catalyst product should be substantially free of cupric oxide. Although somewhat higher and lower temperatures may be employed, temperatures of from 300° C. to about 500° C. are preferred with the temperature being raised gradually or in stages, e.g. in increases of about 100° C. during the greater portion of the total heating period.

If ammonium hydroxide is used as the solvent for the cupric phosphate, it is particularly important that there be thorough ventilation with an oxygen containing gas such as air; otherwise, the ammonia which is produced from the ammonium complex when it decomposes will adversely affect the catalyst at high temperatures.

The support material for the catalysts of this invention may be used in conventional particulate form. The support material may be a high temperature treated inert alumina such as the material sold under the trademark "Alundum" or other heat resistant oxides such as boria, zirconia, titania, silica, or silicon carbide. The shape of the support material is not critical and any conventional milling, comminution grinding or other size reduction method may be employed in preparing the support material for use. Although the particle size of the support material may vary over a relatively wide range, it usually has a particle size in the range of from about 400 mesh to about ¼" diameter, preferably in the range of from 5 to about 50 mesh and has a total surface area of less than about 1 m.²/gm. The preferred support material contains silicon in an amount of from about 5% to about 20% by weight with the remainder having alumina except for traces of other oxides such as ferric oxide, calcium oxide, magnesium oxide, sodium oxide and potassium oxide. The support material, in addition to being inert, should have a macroporous structure so that it can effectively support the catalytically active component. The term macroporous as here used is intended to mean a substance having pores at least 300 A. in diameter. It must be sufficiently inert that feed and product are not strongly adsorbed. High surface area aluminas and silicas such as silica gel are undesirable because the feed and product are strongly adsorbed, thus giving poor selectivity. The macroporous support materials generally have a wetting capacity of about 5 to 20 weight percent.

Olefinic hydrocarbons contemplated for use in the preparation of $\alpha$-$\beta$ unsaturated carbonyl compounds are thoses characterized by having at least 3 carbon atoms and a primary or secondary carbon atom adjacent a double bonded carbon atom. The olefin starting materials may have straight or branched chains or may be cyclic in character. Specific examples of such olefins include, without limitation, propylene, butene-1, butene-2, isobutylene, pentene-1, pentene-2, 2-methyl-butene-2, hexene-1, hexene-2, 4-methyl-pentene-1, 4-methyl-pentene-2, octene-1, cyclopentene, cyclohexene and 3-methyl-cyclohexene. Derivatives of olefinic hydrocarbons of the above described type, which contain hetero atoms or groups substituted therein with the nucleous or as side chains may also be used. The olefin feed stream may be in the form of substantially pure olefins or may contain various mixtures. The invention is particularly adapted for application in the oxidation of lighter olefinic hydrocarbons such as propylene, butenes, pentenes, hexenes and cycloolefins.

Specific examples of conversions produced in accordance with the present method include the conversion of propylene to acrolein, isobutylene to methacrolein, butene-1 to methyl vinyl ketone, pentene-1 to ethyl vinyl ketone, cyclopentene to 2-cyclopentene-1-one, and cyclohexene to 2-cyclohexen-1-one.

The oxidation reaction is conducted by passing a vaporous mixture of olefin feed and oxygen into intimate contact with the above described cupric phosphate-based catalyst at elevated temperatures to provide the desired conversion of the olefin to the corresponding $\alpha$-$\beta$ unsaturated aldehyde or ketone.

The oxygen employed in the process may be in the form of pure oxygen or in the form of a mixture with inert or product gases such as nitrogen, carbon dioxide, water vapor, saturated hydrocarbons such as methane, ethane and propane, which gases function as diluents.

The amount of oxygen employed in the present process may vary over a relatively wide range, but an excess of oxygen over that required for the conversion level used must be present in order to prevent degradation of the catalyst selectivity. Usually the amount of oxygen utilized is that which is required to provide mole ratios of olefin feed to oxygen in the range of from about 0.2:1 to about 5:1, preferably from about 0.4:1 to about 1.5:1. The amount of diluent gas, preferably water vapor, should be enough to provide mole ratios of diluent gas to oxygen in the range of from about 0.2:1 to about 10:1, preferably from about 3:1 to about 5:1. Water vapor, when used, not only serve as a diluent but also increases selectivity for the desired unsaturated carbonyl compound. Pressures generally used range from about 5 to about 200 p.s.i.a., preferably between about 10 and about 30 p.s.i.a.

The temperature conditions depend primarily upon the nature of the particular catalysts and olefin feed stream employed and the desired level of conversion at which the reaction is to be concluded. Generally, elevated temperatures in the range of from about 250° C. to about 600° C. are employed and preferably from about 300° C. to about 500° C. The temperatures at which optimum conversions and selectivity, with respect to unsaturated carbonyl compound production, are achieved for particular catalysts of the invention, may be preliminarily determined by experimentation within the above noted ranges.

The oxidation reaction may be carried out in a batch type or continuous reactor. In commercial operation, use of the continuous reactor is preferred. In a continuously operating system, the olefin-oxygen reaction mixture with or without a diluent gas is passed through a reactor to contact the catalytic material at a space velocity in the range of from about 100 to about 3000 volumes (STP) of total gaseous reaction mixture per volume of catalyst per hour, and preferably from about 500 to about 2000 volumes total gas per volume catalyst per hour.

The catalysts may be employed in the present invention in any conventional manner. For example, they may be placed in the reaction zone in the form of a fixed bed, mechanically moving bed, a fluidized bed, or an entrained bed.

The invention having been fully described above, the following examples are given to show specific embodiments thereof. It will be understood that the examples are given merely for illustrative purposes and not by way of limitation.

EXAMPLE I

A solution of 1.52 gm. of cupric nitrate

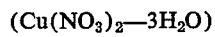

and 0.5 g. of 85% phosphoric acid in 22 ml. of water was employed to moisten 50 gm. of a fused alumina-silica support material sold under the trade name "Alundum" and have a composition of 86.96% alumina, 11.65% silica, and traces of $Fe_2O_3$, $TiO_2$, CuO, MgO, $Na_2O$, $K_2O$, $ZrO_2$, and $HFO_2$. This material had a particle size ranging from 8 to about 20 mesh and a total surface area of less than 1 m.$^2$/gm. The moistened support material was dried at 120° C. and then heated from 200° C. to 500° C. over a time period of 60 minutes in a heating chamber with forced air draft. The resultant calcined material contained 1.6% cupric phosphate and 0.03% excess $P_2O_5$ by weight of the support material.

A 40 cc. sample of the above described material was placed in a 1 inch OD x 12 inch reaction tube having an axial thermowell, and a mixture of 10% by volume propylene and 90% by volume air was passed through the reaction tube at a flow rate of 30 liters (STP) per hour and a space velocity of 750 volumes reaction mixture per hour per unit volume of the catalyst. The pressure within the reaction tube was maintained at about 830 mm. Hg, absolute, and an average temperature within the catalyst bed of 498° C. was maintained. Through-put of the propylene-air mixture was continued for a 30 minute period after which the products of the reaction were collected and analyzed. An analysis of the product stream collected from the reactor revealed a propylene conversion of about 24%. The selectivity of the conversion to various products is shown below in Table 1:

TABLE 1

| Product: | Selectivity, mole percent of converted propylene |
|---|---|
| Acrolein | 34 |
| Saturated carbonyl compound | 11 |
| Acid | 1 |
| Epoxide | 0 |
| $CO_2$ | 31 |
| CO | (not measured) |

EXAMPLE II

In order to compare the characteristics of the catalysts of the invention prepared using acidic and basic copper phosphate impregnation in aqueous media, separate samples of the base material of Example I were employed to prepare catalysts as follows:

(a) One hundred gm. of about 1/8" pellitized support material having the same composition as described in Example I was moistened with a solution of 3.0 gm. of cupric nitrate in 20 ml. of water containing 1.00 g. of 85.9% phosphoric acid. The moistened support material was then calcined in accordance with the procedure of Example I. The resultant catalyst contained about 1.6% cupric phosphate and about 0.03% $P_2O_5$ by weight of the support material and was designated catalyst A.

(b) About 50 gm. of the same support material as used in (a) above were moistened with a 22 ml. aqueous solution containing 0.80 gm. of cupric phosphate, 1.3 ml. of a 29% aqueous ammonium hydroxide, and 0.20 g. of 85.9% phosphoric acid. The moistened support material was then calcined in accordance with the procedure of Example I. The catalyst prepared contained 1.6% cupric phosphate and about 0.24% $P_2O_5$ by weight of the support material and was designated catalyst B.

The procedure of Example I was then repeated to effect the oxidation of propylene using each of the catalysts in turn. The results obtained are set forth in Table 2.

As can be seen from Table 2, the catalyst prepared with the acid solution was slightly more active than the catalyst prepared with the basic solution, but the ammoniacal treatment provided a catalyst having better selectivity with respect to propylene conversion to acrolein.

duces a catalyst having better selectivity in terms of acrolein conversion. The data further shows that a neutrally prepared catalyst is active, but causes some diffi-

TABLE 2

| | Catalyst Bed Temp., °C. | Selectivity, Mole Percent of Converted Propylene | | | | | | |
|---|---|---|---|---|---|---|---|---|
| | | Propylene Conversion | Acrolein | Saturated Carbonyl Compound | Acid | Epoxide | $CO_2$ | CO |
| Catalyst: | | | | | | | | |
| A | 468 | 22 | 31 | 7 | 2 | 1 | 37 | 21 |
| B | 515 | 12 | 37 | 10 | 1 | 0 | 28 | 24 |

EXAMPLE III

To further demonstrate the effect of employing an acidic or basic treatment of the support material in the preparation of the catalysts of the invention and to compare this procedure with catalysts prepared using a neutral impregnation treatment in the catalyst preparation, the following tests were conducted.

A series of catalysts were prepared from freshly precipitated nitrate-free cupric phosphate by dissolving the cupric phosphate in the appropriate solvent and adding 85.9% phosphoric acid where an excess of phosphate was desired. Sufficient amounts of the treating solutions were employed to provide catalysts having the desired 5% cupric phosphate content. Impregnation solutions were made up to a volume of 30 ml. Where an acid impregnation was desired, the cupric phosphate was dissolved in 5 ml. concentrated nitric acid and then diluted to 30 ml. For alkaline impregnation, 10 ml., 29% ammonia was used to dissolve the cupric phosphate. The neutrally prepared sample was prepared by wetting and mixing 100 gm. of support material with a suspension of 5 gm. of cupric phosphate in 30 ml. of water containing no free phosphoric acid, drying at 120° C., and calcining the dried catalyst slowly in 100° C. increments from 200° C. to 500° C. and holding at 500° C. for 2 hours.

In order to determine the characteristics of catalysts which are essentially free of excess $P_2O_5$, additional samples were prepared following the acidic and basic treatment steps above with the exception that phosphoric acid was eliminated from the treating solutions. The additional catalyst samples were prepared by utilizing in each case a treating solution containing 3.0 g. of 85.9% phosphoric acid which provided final catalysts having excess $P_2O_5$ content outside of the range of the catalysts of the invention.

The procedure of Example I was then repeated utilizing each of the catalysts for the oxidation of the propylene feed. The results observed are set forth in Table 3.

The data in Table 3 again shows that the use of an acid treatment in the catalyst preparation provides a more active catalyst, and that the use of a basic treatment proculty in temperature control, and is characterized by poorer acrolein conversion selectively.

The above tests also show that the catalyst having a weight ratio of cupric phosphate to excess $P_2O_5$ of greater than 10:1 are considerably more active than those containing larger amounts of exces $P_2O_5$ and display appreciably more selectivity with respect to the desired conversion of propylene to acrolein.

EXAMPLE IV

To compare the results obtained by the utilization of the catalysts of the invention with those produced by the use of related catalytic materials including catalysts such as are described in British Patent 839,808, the following catalysts were prepared and tested:

(a) A cupric phosphate catalyst on a high surface area silica gel base was prepared following the procedure outlined in British Patent 839,808. The catalyst contained about 3.7% cupric phosphate and about 10.9% $P_2O_5$ by weight of the silica base material and was designated catalyst J.

TABLE 3

| | Treatment | Excess $P_2O_5$ percent by weight | Catalyst Bed Temp., °C. | Selectivity, Mole Percent of Converted Propylene | | | | | | |
|---|---|---|---|---|---|---|---|---|---|---|
| | | | | Propylene Conversion | Acrolein | Saturated Carbonyl Compound | Acid | Epoxide | $CO_2$ | CO |
| Catalyst: | | | | | | | | | | |
| C | Acid | | 368 | 14 | 32 | 10 | 2 | 1 | 38 | 17 |
| D | do | 0.18 | 367 | 16 | 31 | 10 | 1 | 1 | 40 | 17 |
| E | do | 1.9 | 553 | 16 | 19 | 12 | 5 | 0 | 40 | 24 |
| F | Basic | | 418 | 21 | 37 | 9 | 1 | 1 | 32 | 20 |
| G | do | 0.18 | 414 | 17 | 40 | 9 | 2 | 1 | 29 | 19 |
| H | do | 1.9 | 550 | 15 | 15 | 11 | 2 | 3 | 51 | 18 |
| I | Neutral | | 375 | 9 | 23 | 5 | 1 | 2 | 49 | 20 |

(b) A catalyst was prepared again following the procedure of the amove noted British patent except that the support material of Example I was substituted for silica gel and 0.34% cupric phosphate and 1.3% $P_2O_5$ based on the weight of the support material was used. This gives a $Cu_3(PO_4)_2$ to $P_2O_5$ ratio of 1:3.8. This catalyst was designated catalyst K.

(c) A catalyst was prepared in accordance with the procedure of Example I with the exception that high surface area, active alumina was used as the support material. The catalyst contained about 1.6% cupric phosphate and about 0.1% excess $P_2O_5$ by weight of the aluminum base material and was designated catalyst L. The $Cu_3(PO_4)_2$ to $P_2O_5$ ratio of this example was thus within the preferred limits of this invention.

(d) A catalyst was prepared following the procedure of Example I with the exception that the silica gel used in preparing catalyst J above was used as the support material. This silica base catalyst contained 10% cupric phosphate and 0.2% excess $P_2O_5$ by weight of the base material and was designated catalyst M.

(e) Crystalline cupric phosphate trihydrate was calcined as in Example I and was designated catalyst N.

The procedure of Example I was repeated using each of these materials as a catalyst for the oxidation of propylene. The results obtained are set forth in Table 4.

minutes during which period it was contacted with an air stream fed at a rate of about 25 per hour. The resultant catalyst was designated catalyst O.

TABLE 4

| Catalyst: | Catalyst Bed Temp., °C. | Selectivity, Mole Percent of Converted Propylene | | | | | | |
|---|---|---|---|---|---|---|---|---|
| | | Propylene Conversion | Acrolein | Saturated Carbonyl Compound | Acid | Epoxide | $CO_2$ | CO |
| J | 364 | 15 | 17 | 8 | 8 | 0 | 37 | 30 |
| K | 545 | 4 | 18 | 12 | 3 | 5 | 62 | (²) |
| L | ¹275 | 11 | <1 | 0 | 0 | 0 | 65 | (²) |
| M | ¹288 | 7 | 33 | 12 | 5 | 0 | 42 | 8 |
| N | ¹240 | 3 | 32 | 7 | 1 | 0 | 49 | 11 |

¹ Temperature control difficult and above indicated temperature reaction run-away conditions observed.
² Measurement not made.

From the above data, it can be seen that the silica-supported cupric phosphate catalyst (J) contains appreciably larger proportions of $P_2O_5$ than the catalyst of the present invention and displays significantly worse selectivity for propylene conversion to acrolein. The catalyst prepared using the support material of Example I but with an appreciably greater proportion of absorbed $P_2O_5$ (catalyst K) than was used in Example I was almost inactive with poor acrolein conversion selectivity. The data futher shows that high surface area silica and alumina-supported cupric phosphate catalysts (L and M) containing excess $P_2O_5$ within the range used in the catalysts of the present invention had temperature control problems, with run-away reaction conditions being observed at low conversion levels and with the alumina-based catalyst (L) suffering from the further disadvantage that acrolein conversion selectively was almost non-existent. It will be noted that the unsupported cupric phosphate sample employed (N) likewise exhibited run-away reaction conditions at low conversion levels.

EXAMPLE V

In order to determine the effect of varying the ventilation conditions during the calcination step in the preparation of the cupric phosphate catalysts of the invention, one large sample of catalyst was prepared containing about 5% cupric phosphate and about 0.19% excess $P_2O_5$ by weight of the support material of Example I, and small portions were calcined under varying ventilation conditions in accordance with the following techniques:

(a) 300 gm. of the pelletized ⅛″ fused alumina-silica support material of Example II was moistened with a solution of 15 gm. (dry weight basis) of freshly precipitated cupric phosphate in 55 ml. of a 29% ammonium hydroxide aqueous solution containing 1.041 g. of diammonium hydrogen phosphate in 10 ml. of water. The moistened material was then dried at 60° C. in rotating flask at 25 to 50 mm. absolute pressure, in a stream of air which had previously been passed through 29% aqueous ammonia solution. A final drying at 70° C. with ammonia-free air was conducted for one hour and produced an evenly impregnated 5% cupric phosphate and 0.19% $P_2O_5$ by weight of support material catalyst. A 45.5 g. (30 ml.) portion was heated rapidly in a glass tube from 30° C. to 465° C. over a time period of about 32

(b) A second 45.5 g. portion of 70° C. dried catalyst from (a) above was spread evenly in a flat, open container and charged without perheating into a furnace preheated to about 500° C. which was vented to the atmosphere. The resulting catalyst was designated catalyst P.

(c) A third 45.5 g. portion of catalyst predried at 70° C. from (a) above was spread evenly in a flat, open container and initially heated in a ventilated muffle to about 200° C. and subsequently further heated to about 500° C. with the temperature being raised by 100° C. graduations. The material obtained was designated catalyst Q.

(d) The procedure of (c) above was repeated with a fourth 45.5 g. portion of catalyst dried at 70° C. from (a) above with the exception that during the heating the material was covered by an inverted beaker to retain an atmosphere of decomposition products around the catalyst. The material produced was designated catalyst R.

The procedure of Example I was repeated with the exception that feed stream space velocities of about 1000 volumes of gaseous feed per volume of catalyst per hour were utilized with each of the described catalysts in the oxidation of propylene. The results observed are set forth in Table 5.

TABLE 5

| Catalyst: | Catalyst Bed Temp., °C. | Selectivity, Mole Percent of Converted Propylene | | | | | | |
|---|---|---|---|---|---|---|---|---|
| | | Propylene Conversion | Acrolein | Saturated Carbonyl Compound | Acid | Epoxide | $CO_2$ | CO |
| O | 446 | 26 | 31 | 8 | 1 | 0 | 39 | 21 |
| P | 441 | 33 | 23 | 8 | 1 | 0 | 47 | 21 |
| Q | 444 | 26 | 30 | 8 | 1 | 0 | 40 | 21 |
| R | 351 | 15 | 17 | 8 | 1 | 0 | 63 | 10 |

The data in Table 5 demonstrates that carrying out the calcination step in the preparation of the catalyst of the invention under ventilated conditions produce catalysts (O and Q) having satisfactory activities and acrolein conversion selectivities. On the other hand, catalyst P, calcined under flash heating conditions, and catalyst R, calcined under non-ventilation conditions, exhibited slightly higher activities, but at considerable sacrifice in selectivity.

EXAMPLE VI

To determine the effect of employing water vapor in the feed stream, the procedure of Example I was repeated in the oxidation of propylene with the exception that a catalyst prepared in accordance with a combination of the procedures of Example V(a) and (c) above was used. A feed stream space velocity of about 1390 volume total feed mixture per volume catalyst per hour was used, and water vapor was injected into the reaction zone at the rate of about 9.4 ml. per hour. The average catalyst bed temperature was 419° C. and a propylene conversion of 7% was achieved. The selectivity of the propylene conversion was found to be as indicated below in Table 6:

TABLE 6

| Product: | Selectivity, mole percent of converted propylene |
|---|---|
| Acrolein | 51 |
| Saturated carbonyl compound | 13 |
| Acid | 2 |
| Epoxide | 0 |
| $CO_2$ | 26 |
| CO | 7 |

EXAMPLE VII

A catalyst was prepared from 8–20 mesh fused alumina support material with the compositon as in Example I in accordance with the procedure of Example V(a) above, with the exception that the aqueous ammonium hydroxide treating solution employed contained 1.56 gm. of diammonium hydrogen phosphate. The resulting material had a cupric phosphate content of 5% and an excess $P_2O_5$ content of 0.3% by weight of the support material. Two runs were carried out using this catalyst in accordance with the procedure of Example I to effect the oxidation of propylene. The results obtaned are shown in Table 7 below:

TABLE 7

|  | Run 1 | Run 2 |
|---|---|---|
| Temperature, °C | 470 | 47 |
| Propylene Conversion, percent | 26 | 29 |
| Selectivity: |  |  |
| Acrolein | 41 | 38 |
| Saturated Carbonyl Compound | 11 | 10 |
| Acid | 2 | 1 |
| Epoxide | 0 | 0 |
| $CO_2$ | 25 | 27 |
| CO | 21 | 24 |

What is claimed is:

1. A method for preparing an $\alpha$-$\beta$ unsaturated carbonyl compound from an olefin having at least 3 carbon atoms which comprises: heating a mixture of said olefin and oxygen at an elevated temperature in the presence of a catalyst comprising a macroporous support material having pores of at least 300 A. in diameter and having deposited thereon a catalytically effective amount of cupric phosphate.

2. The method of claim 1 wherein said catalyst comprises a support material having deposited thereon cupric phosphate and excess $P_2O_5$, the weight ratio of cupric phosphate to excess $P_2O_5$ being at least about 10:1.

3. The method of claim 2 wherein said olefin is an olefinic hydrocarbon having from about 3 to about 8 carbon atoms.

4. The method of claim 3 wherein said olefin is propylene and said $\alpha$-$\beta$ unsaturated carbonyl compound is acrolein.

5. The method of claim 2 wherein said cupric phosphate and $P_2O_5$ is present in the range of from about 0.1% to about 15% by weight of said support material.

6. The method of claim 2 wherein the weight ratio of said cupric phosphate to said $P_2O_5$ is in the range of from about 15:1 to about 50:1.

7. The method of claim 2 wherein the mole ratio of said olefin to said oxygen is in the range of from about 0.2:1 to about 5:1.

8. The method of claim 2 wherein said support material has a surface area of less than about 1 m.$^2$/gm.

9. The method of claim 8 wherein said support material has an alumina content of from about 70% to about 95% and a silica content of from about 5% to about 15% by weight.

10. The method of claim 2 wherein said heating is carried out at a pressure in the range of from about 5 to about 200 p.s.i.a. and at a temperature in the range of from about 250° C. to about 600° C.

11. The method of claim 2 wherein said olefin and oxygen are passed over a bed of said catalyst at a space velocity in the range of from about 100 to about 3000 volumes of total vapor at STP per volume catalyst per hour.

12. The method of claim 2 wherein said olefin and oxygen are passed over said catalyst in the presence of a diluent gas selected from the group consisting of inert gases and gases which are formed as products of said heating.

13. A method for preparing $\alpha$-$\beta$ unsaturated carbonyl compound from an olefin having at least three carbon atoms which comprises:

heating a mixture of said olefin and oxygen at an elevated temperature in the presence of an oxidation catalyst comprising a macroporous support material having deposited thereon an effective amount of a catalytically active material selected from the group consisting of cupric phosphate and a mixture of cupric phosphate and $P_2O_5$, said catalyst being prepared by impregnating said macroporous support materal having pores of at least 300 A. in diameter with an active material selected from the group consisting of cupric phosphate and a mixture of cupric phosphate and $P_2O_5$, heating said impregnated support material to precipitate said catalytically active material on said support material and to drive off all materials normally volatile at temperatures up to about 200° C.

References Cited

UNITED STATES PATENTS

| 3,274,255 | 9/1966 | Brill et al. | 260—604 |
| 2,627,527 | 2/1953 | Connolly et al. | 260—604 |

FOREIGN PATENTS

| 839,808 | 6/1960 | Great Britain. |

LEON ZITVER, Primary Examiner
R. H. LILES, Assistant Examiner

U.S. Cl. X.R.
252—435, 437